United States Patent [19]
Borow

[11] Patent Number: 4,639,260
[45] Date of Patent: Jan. 27, 1987

[54] DUST SEPARATOR

[76] Inventor: Henry Borow, 185 Berlioz, Apt. 2N, Nuns Island, Verdun, Quebec, Canada, H3E 1C1

[21] Appl. No.: 798,956

[22] Filed: Nov. 18, 1985

Related U.S. Application Data

[63] Continuation-in-part of Ser. No. 627,196, Jul. 2, 1984, abandoned.

[51] Int. Cl.$^4$ .................. B01D 46/04; B01D 50/00
[52] U.S. Cl. .................................. 55/302; 55/319; 55/324; 55/331; 55/334; 55/341 R; 55/418
[58] Field of Search ............... 55/96, 97, 302, 319, 55/324, 331, 334–336, 341 R, 379, 418, 432, 463

[56] References Cited
U.S. PATENT DOCUMENTS

| | | | |
|---|---|---|---|
| 984,810 | 2/1911 | Green | 55/334 |
| 999,269 | 8/1911 | Spencer | 55/334 |
| 1,147,463 | 7/1915 | Ulrici | 55/418 |
| 3,430,419 | 3/1969 | Reinecke et al. | 55/302 |
| 3,867,116 | 2/1975 | Müller | 55/319 |
| 3,917,458 | 11/1975 | Polak | 55/418 X |
| 4,007,026 | 2/1977 | Groh | 55/334 X |
| 4,251,244 | 2/1981 | Evenstad | 55/341 R X |

FOREIGN PATENT DOCUMENTS

| | | | |
|---|---|---|---|
| 871346 | 2/1953 | Fed. Rep. of Germany | 55/341 R |
| 611646 | 6/1978 | U.S.S.R. | 55/432 |

Primary Examiner—Robert Spitzer
Attorney, Agent, or Firm—Swabey, Mitchell, Houle, Marcoux & Sher

[57] ABSTRACT

The present invention relates to an apparatus for filtering solid matter from a gas. It particularly relates to improvements in bag house type filters for use in cleaning gas streams. There is provided a gas filter apparatus consisting of, in combination, a chamber having a top, base, and side walls, a conveyor tube for passing the solid laden gas into the chamber and centrally of a partition wall dividing the chamber into upper and lower compartments, gas and solid matter exit ports on the conveyor tube, in the lower compartment only, for use in distributing the gas and solid matter from the conveyor tube and directing at least a portion of the solid matter toward the base by gravity. The partition includes a number of openings communicating the upper and lower compartments, and filter tubes are provided in the lower compartment covering the openings. A suction device communicates with the upper compartment for venting the gas therefrom while a discharge device is provided at the bottom of the chamber for discharging the solid matter therefrom.

16 Claims, 7 Drawing Figures

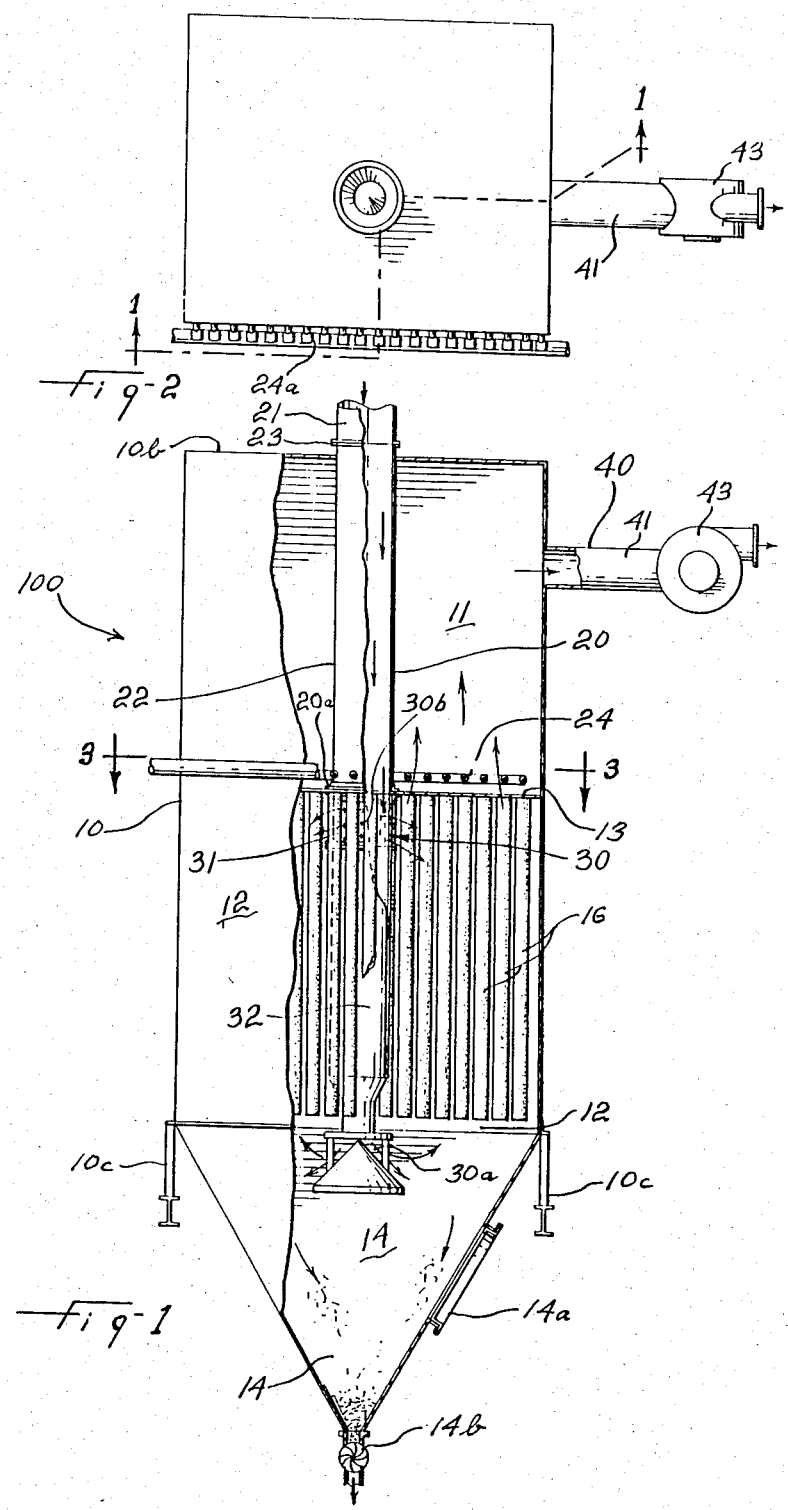

DUST SEPARATOR

CROSS-REFERENCE TO RELATED APPLICATION

This application is a continuation-in-part of application Ser. No. 627,196, filed July 2, 1984 now abandoned.

BACKGROUND OF THE INVENTION

1. Field of the Invention

The present invention relates broadly to methods and apparatus for filtering solid matter from a gas stream. It particularly relates to improvements in bag house type filters for use in cleaning gas streams.

2. Description of the Prior Art

Various examples of the latter are known including that disclosed in Rolschau's U. S. Pat. No. 3,963,467, dated June 15, 1976. Such dust filter apparatus and others of the prior art, however, suffer major disadvantages, including the problem of redepositing of dust on the filter bags during operation of the apparatus.

It has been established that high velocity fabric filtration has distinct advantages over filtration at low velocities in that the equipment required to clean a gas stream is reduced in size and first cost, as filtration velocity increases. However, experiments on pulse-jet cleaned filters have shown that penetration and pressure drop across the filter media increases markedly at high filtration velocities. The reasons for this include dust redeposition on the bags following a cleaning pulse. At high filtration velocities, most of the dust freed by a cleaning jet pulse is reswept back to the filter bags rapidly and does not fall away therefrom to be collected in the base of the bag house, which is usually of funnel or hopper shape. As a result, a thick dust deposition develops on the filter bags, pressure drop increases, and air flow decreases.

Commercial pulse jet filters are available wherein the gas inlet is located at the bottom of the filter housing. Although a bottom inlet is sometimes preferred, in that it permits large particles in the gas stream to fall immediately into the base-hopper to avoid accumulation on the filter bags, such has the distinct disadvantage of keeping dislodged dust suspended inside the housing and thus permitting easy redeposition on the filter bags.

As may be observed, with bottom entry, the net upward gas velocity within the housing will be greatest at the housing bottom, where the entire gas stream must enter and flow upward to be filtered, and least at the top, by which point all process gas will have been drawn through the bags. Following a cleaning pulse, dislodged dust must fall through the housing bottom, where upward gas velocity is highest. To reach the hopper, particles and agglomerates must have a terminal settling velocity greater than that of the upward moving gas. This limits filtration capacity of the bag house expressed in terms of cubic feet per minute of air per square foot of filter used. Clearly, when small particles or particles which do not agglomerate readily are to be collected in a pulse jet filter, a gas inlet near the housing top is of substantial advantage compared to a gas inlet near the bottom thereof. The advantage becomes greater as filtration velocities increase.

It is reasoned that if redeposition can be minimized in a pulse jet filter, reductions in pressure drop and penetration and increase in air flow will follow.

SUMMARY OF THE INVENTION

It is, therefore, a main object of the present invention to provide an improved apparatus of the latter-mentioned type which overcomes the problems discussed. Other objects and advantages will become apparent from the description hereinafter.

In accordance with the present invention, the aforementioned main objective is achieved by providing an improved filter housing, more particularly one wherein an improved gas flow pattern is established. The improved gas flow ensures that when the filter cake is freed from the surface of a bag during a cleaning pulse, it will fall through the filter housing to reach the base or hopper thereof, from which it may be conveniently removed. As a result of the present invention, the direction and velocity of gas flowing within the housing has a strong influence whether the dust falls to the base-hopper or redeposits on a bag. Thus, the gas flow in the housing in accordance with the present invention assists the freed dust to reach the base or hopper rather than hindering its movement thereto, such resulting in reduced redeposition and improved filter performance.

An important aspect inherent in the design in accordance with the present invention is thus the orientation and location of the gas inlet in the filter housing. Embodiments according to the present invention further provide improved dry scrubbing systems.

A construction in accordance with the present invention comprises a gas filter apparatus for separating solids from a gas stream comprising a housing having a top, base, and side walls defining a chamber and a partition wall extending across the chamber and separating the chamber into an upper compartment and a lower compartment. A gas inlet conveyor tube is provided in the chamber passing downwardly of the partition and into the lower compartment, with the portion of the conveyor tube passing through the upper compartment being impervious and the portion of the conveyor tube extending downwardly into the lower compartment being provided with exit means, including exit apertures on the conveyor tube adjacent the partition wall. The partition wall is provided with a plurality of openings surrounding the conveyor tube and communicating the lower compartment with the upper compartment. Filter means in the form of filter tubes cover each opening in the partition wall and extend downwardly in the lower compartment and parallel to the conveyor tube. At least one gas outlet communicates with the upper compartment, and suction means is associated with the gas outlet to provide a reduced pressure within the chamber. Discharge means are provided at the base of the housing associated with the lower compartment for discharging solid matter separated from the gas stream, whereby solid laden gas is conveyed into the lower compartment downwardly by the conveying tube, and the gas of the stream is drawn from the conveyor tube immediately past the partition, through the surrounding filter tubes in a manner to prevent the formation of counter gas flows to the gravity discharge of the solids being separated from the gas stream.

BRIEF DESCRIPTION OF THE DRAWINGS

The invention is illustrated by way of example in the accompanying drawings, wherein:

FIG. 1 is a side part sectioned elevational view taken along line 1—1 in FIG. 2 of an apparatus in accordance with the present invention;

FIG. 2 is a plan view of the apparatus shown in FIG. 1;

DESCRIPTION OF THE PREFERRED EMBODIMENTS

Figure 3:
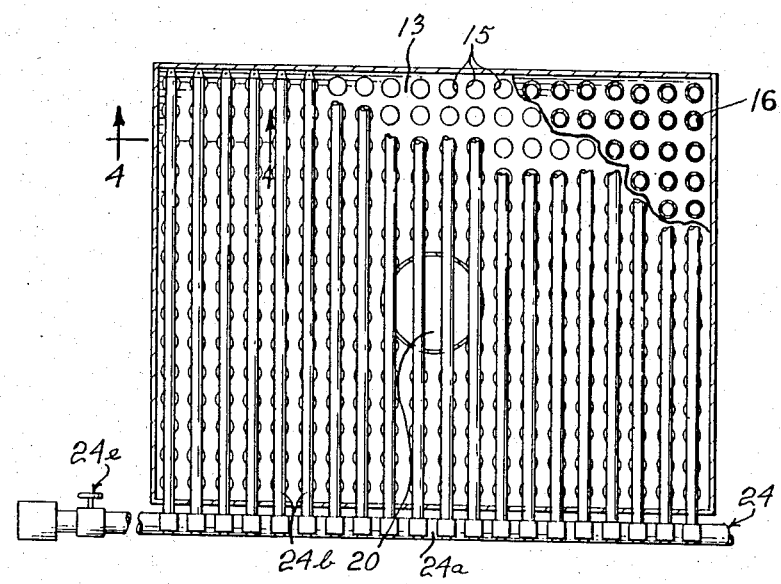
FIG. 3 is a sectioned view taken along line 3—3 in FIG. 1.

Referring firstly to FIG. 1, there is seen a bag house type apparatus 100 comprising a chamber 10 having a gas conveying means 20 passing centrally through the top wall thereof, gas exit means 30 and 30a depending centrally within chamber 10 for use in distributing the conveyed gas and solid matter therein, directing at least a portion of the latter toward the funnel-shaped base of chamber 10, and fluid vent means 40 also located adjacent the top wall of chamber 10.

Chamber 10 comprises, in the case of the FIG. 1 embodiment, a top plenum 11, otherwise known as the clean chamber, and a bottom plenum 12, otherwise known as the dirty chamber, divided by a partition 13, otherwise known as the tube sheet. Further, a base 14 is provided which is funnel-shaped and thus of pyramidal hopper configuration. Exit means 30 is located within plenum 12 and further exit means 30a is located within base 14. Plenums 11 and 12 are rectangular or square in cross-section although such is a matter of choice. Chamber 10 quite conceivably could be round in cross-section.

Figure 4:
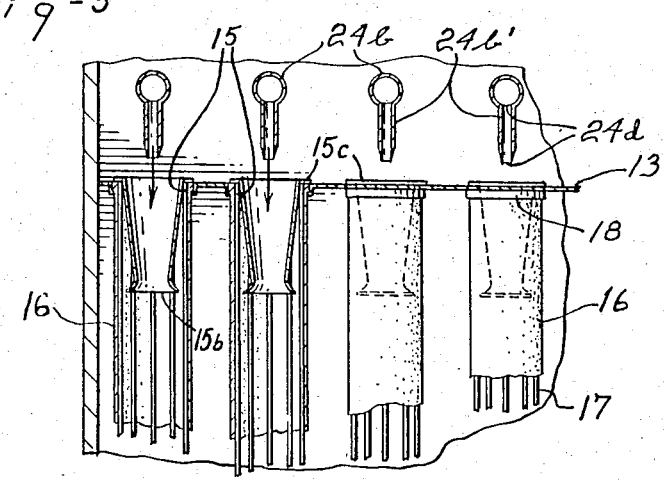
FIG. 4 is a fragmentary sectional view taken along line 4—4 in FIG. 3.

Partition or tube sheet 13, more clearly seen in FIG. 4, includes a plurality of apertures 15 permitting fluid to flow from lower plenum 12 to upper plenum 11. A filter bag 16 depends from each aperture 15, such being supported upon annular lip portions 18 of partition 13, and further supported by a cylindrical wire frame 17 inserted downwardly into filter bag 16. As clearly seen from FIG. 4, cylindrical wire frame 17 is suspended via lugs extending outwardly of a depending venturi member 15b, which itself is supported via its annular flange 15c upon partition 13. As will be appreciated, such an arrangement permits convenient installation and removal of filter bags 16.

Gas conveying means 20 comprises tubular members 21 and 22 connected together via a flange 23, member 22 extending centrally of chamber 10 to be secured to partition 13, via flange 20a which is apertured to allow flow to exit means 30 and 30a. The tubular member 21 passes through the roof 10b of the plenum 11. It may also enter through a side wall of the plenum 11 (not shown).

Figure 7:
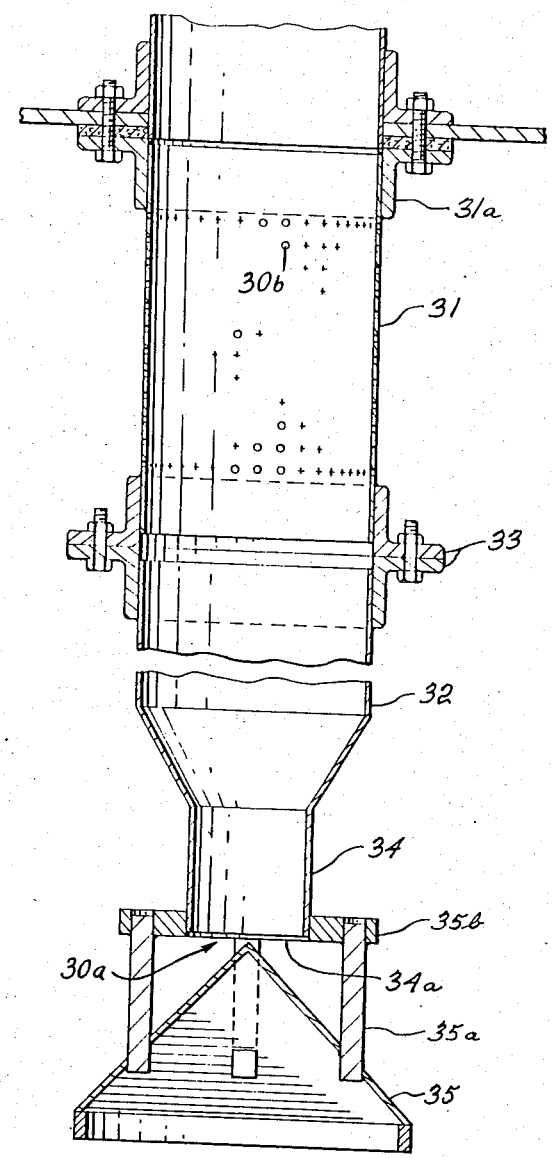
FIG. 7 is a sectioned elevational view of a part of that shown in FIG. 1.

Exit means 30 and 30a, clearly seen in FIG. 7, comprises respectively a perforated or apertured tubular member 31 and a further unperforated, i.e., non-apertured, tubular member 32 bolted together via a flange 33, member 31 being bolted to the underside of partition 13 via a gasket and flange 31a, also clearly seen in FIG. 7. Tubular member 32, it will be noted, is tapered toward the bottom thereof to provide a reduced portion 34 having an aperture 34a opening onto a cone-shaped deflector 35 supported by legs 35a rigidly secured to portion 34 via a flange 35b.

As seen in FIGS. 3 and 4, located vertically above partition 13, is a fluid dispensing device 24 comprising a feeder-header pipe 24a and branch pipes 24b. As indicated in FIG. 4, branch pipes 24b are apertured at 24d for use in emitting compressed fluid therefrom in a direction toward and through apertures 15 and accordingly within and through filter bags 16. If desired, as in the preferred embodiment shown, a nozzle 24b' may be connected to pipe 24b surrounding aperture 24d whereby the fluid, namely, compressed air, is positively directed toward the inside of venturi member 15b for effective delivery to within bag 16. Feeder header pipe 24a is connected to a valve control means 24e shown diagrammatically in FIG. 3, the purpose of which will become apparent from the description hereinafter. As seen in FIG. 3, pipes 24b extend across and thus pass through conveyor means 20 but are sealed therefrom.

Base portion 14 also includes a manhole 14a providing ready access therewithin and a bottom gated discharge opening comprising a rotary air lock valve 14b.

As best seen in FIG. 1, vent means 40 comprises a tubular member 41 suitably connected to the side wall of chamber 10. Member 41 includes therein air extraction blower arrangement 43 of well-known commercial type. As may be understood, vent means 40 might not be located in the side wall, such being a preferred location.

Chamber 10 is mounted via structural members 10c in a conventional manner.

Figure 5:
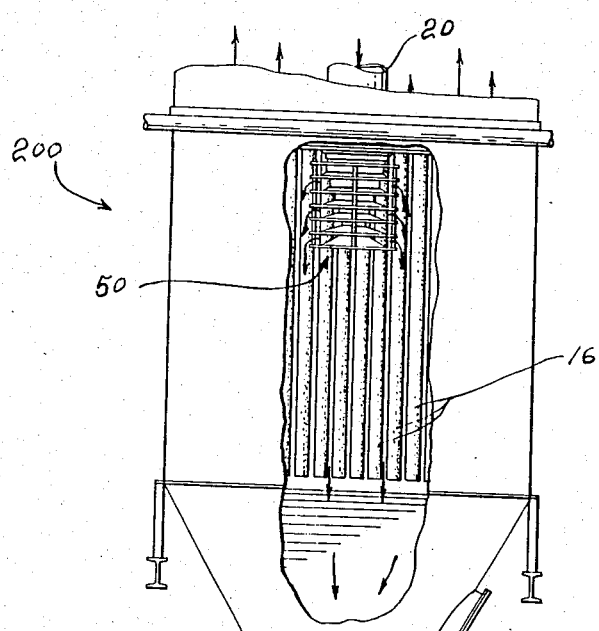
FIG. 5 is a side part sectioned elevational view of a further embodiment in accordance with the present invention.

Turning now to the second preferred embodiment of bag housing type apparatus shown and designated 200 in FIG. 5, such apparatus is identical to aforedescribed apparatus 100, except for the conveyor fluid exit means. Thus, description of apparatus 200 will be limited to the conveyor gas exit means. Apparatus 200 provides a dry scrubbing system wherein the primary separation of particles is not desired.

Figure 6:
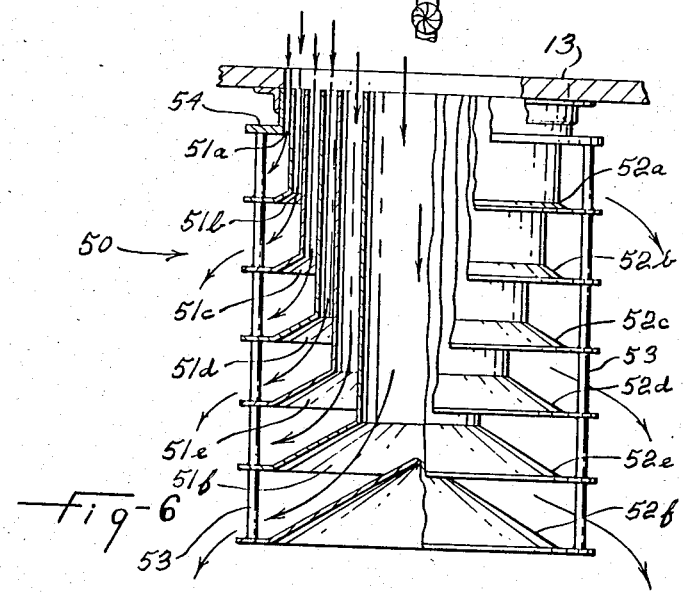
FIG. 6 is a fragmentary cross-sectional view of a detail shown in FIG. 5.

Referring to FIG. 6, there is seen exit means 50 comprising a plurality of concentrically arranged, downwardly depending, annular in cross-section, tubular depending passages 51a, 51b, 51c, 51d, and 51e, terminating respectively at reflectors 52a, 52b, 52c, 52d, and 52e. Also, a central aperture 51f terminates adjacent a conical deflector 52f. Further, that deflectors 52a, 52b, 52c, 52d, 52e, and 52f are secured in spaced relation one to another by spacer rods 53 suspended from flange 54 secured by suitable means to partition exit means 30 and 30a, exit means 50 terminates at a position located substantially above the terminal free ends of filter bags 16 and nearer to the partition.

Turning first to the operation of apparatus 100, an air stream to be cleaned is drawn by the blower arrangement 43 downwardly through conveyor tube 20 to exit via apertures 30b of exit means 30 and apertures 34a of exit means 30a. As the air exits through apertures 30b, it moves in a generally lateral and downward direction before reaching the bags 16 and is thereafter driven upwardly within the bags 16 with the air which has exited via exit means 30a. The latter is first deflected generally downwardly, by cone shaped deflector 35 and then rebounded off base portion 14, causing it to move in an upward direction. The air to be cleaned thus enters filter bags 16 from all sides thereof, the cleaned air passing through aperture 15 and thence through vent 41 aided by blower arrangement 43, following passage through top portion 11 of chamber 10.

In order to keep filter bags 16 generally cleaned, they are subjected to pulse-jetting of compressed air by fluid dispensing device 24. The latter operates via suitable well-known controls, which emits timed jet streams of air via apertures 24d for dispersal within filter bags 16, causing caked dust, etc., to be dislodged from the outer surface of bags 16 and thereafter carried therethrough by the air stream to be cleaned. Detailed description of controls 24a is dispensed with as it is believed construction of such is well within the knowledge of those to whom the invention is directed.

Controls (not shown) may be provided whereby selected ones of bags 16 are pulse jetted while others are not, the pulse jetting being operated through a suitable timing device (not shown). Thus, during continuous operation of apparatus 100 and 200 to be described, bags 16 in turn are periodically cleaned.

Turning now to the operation of the apparatus 200, such operates in a different fashion to that of apparatus 100 since the air to be cleaned is exited at a point substantially above the terminal free ends of filter bags 16 by exit means 50, as afore-indicated. Exit means 50 moves the air to be cleaned in an outward and downward direction within chamber 10, the exited air moving downwardly toward base portion 14 and following rebound therefrom, moves upwardly through filter bags 16 to exit from apertures 15. The continued path of the cleaned air is then as described above regarding apparatus 100. Thus, from FIG. 5 and the arrows depicting the air movement, it will be seen air in this embodiment moves generally in first a downward and then an upward direction. Of course, air, as in the case of apparatus 100, enters filter bags 16 in a lateral direction more particularly though with apparatus 200 due to the design and location of the fluid stream exit means relative to the bags. On the other hand, if desired, extensive downward movement of air may be arranged in apparatus 200 tending to frictionally clean filter bags 16, thus aiding further cleaning of the same, i.e., in a non-dry scrubbing arrangement. Attention is directed to the arrows pointing downwardly from between respective filter bags. As in the case of apparatus 100, accumulated solid matter is periodically removed from the base portion 14 utilizing gate discharge 14b. With the dry scrubbing system of apparatus 200, the primary separation of particles not being desired, since the particles are needed for coating the filter bag surface, the fluid or air containing all particles is split and directed sideways and then downwards through the filter area by means of the deflecting concentric fins.

As will be realized, operation of apparatus 100 and 200 may be adjusted depending on the type of air or gas to be cleaned. Such adjustment may comprise increasing or decreasing pressure of the gas or air to be cleaned, varying the type of filter bag 16, i.e., type and density of filtering, the size of apertures 30b and 15, etc., size and shape of chamber 10, extraction force of blower arrangement 43, and other aspects.

Depending on the medium to be filtered, it is visualized, the filter apparatus in accordance with the present invention, in its simplest form, may merely comprise a chamber having a top, base, and side walls; a fluid and solid matter conveying means passing through the top wall substantially centrally thereof; fluid and solid matter exit means on the conveying means within the chamber and depending centrally therewithin for use in distributing the fluid and solid matter from the conveying means for directing at least a portion of the solid matter toward the chamber base, and a fluid vent means in the chamber above the base for venting from the chamber, preferably located adjacent or possibly in the top wall. Such basic apparatus provides the unique gas circulation of the present invention whereby, apart from the filter bags, much matter is deposited directly in the base of the chamber. The apparatus in accordance with the invention thus tends to lighten the function carried out by the filter bags when used. A further feature of the apparatus according to the invention is the locating of the exit means relatively close to the partition or tube sheet. Not extending the exit means substantially downwardly of the tube sheet ensures keeping relatively low outlet velocity affording protection for the bags, when used.

It is visualized that variations may be made in the designs in accordance with the present invention and which may include providing more or fewer apertures 15 and locating the same one from another differently to that disclosed. In terms of filter bags 16 and apertures 15, such may comprise, as a variation, a single annular bag depending from a single annular aperture surrounding the exit means. Accordingly, an annular design of jet pulse arrangement would be utilized therewith. In a further embodiment, a plurality of concentrically arranged annular apertures and depending bags might be used. It is visualized that the apparatus, in accordance with the present invention, may also include, though not shown, a means for vibrating the filter bags, being an alternative to or an addition to the jet pulse bag decaking device. Such vibrating means may take the form of springly mounting the filter bag in association with an oscillating means to impart a shaking of the filter bag.

A number of advantages are provided by the apparatus in accordance with the present invention and such include: providing a simple and easy solution to the mechanical and structural problems associated with other gas-air type conveying means entrances; providing a reduction in horizontal gas velocity through the filter bags, such stemming from the central and symmetrical location of the gas-air entrance; providing reduction in filter bag damage, such stemming from the primary separation of large particles provided; providing more uniform velocity and particles distribution across the bag house; providing low air velocity at the entrance through the filter bags; as inferred above, in the case of a dust collector, arranging that large particles are separated from the gas-air upon leaving the centrally located conveying means which acts as a primary separator through the downward motion of inertia and discharge through the bottom air deflector, such as seen in FIG. 1; providing that particles and agglomerate freed from a cleaning pulse are drawn toward the base-hopper by the air-gas flowing in the same downward direction, the advantage becoming greater as the air-gas flow or bag house capacity and filtration velocity increases, noting that with bottom entry of the conveyor means, the bag house capacity is limited by air velocity and with top entry, the contrary, the bag house capacity and performance being enhanced by the air velocity; providing, in the case of a dust collector, that most air enters the filter area radially through the perforated section of the inlet duct located as close as possible to the tube sheet, i.e., portion, only a small portion of the total air goes through the small bottom opening carrying the separated dust, the bottom outlet eliminating any pockets where the dust could collect, the air-gas deflector diverting air radially and preventing disturbance of any solids below the hopper; and finally, with reference to the case of a dry scrubber system, the primary separation of particles being not desired, and since the particles are needed for coating of bag surface, the air containing all particles is split and directed sidewards and then downwards through the filter area by means of deflecting concentric fins, exemplified by FIG. 6.

It is understood that the gas conveyor tube 20 may be located in an area of the partition other than the center thereof; however, the central location is preferred.

I claim:

1. A gas filter apparatus for separating solids from a gas stream comprising a housing having a top, base, and side walls defining a chamber, a partition wall extending across the chamber and separating the chamber into an upper compartment and a lower compartment, a gas inlet conveyor tube in the chamber passing downwardly of the partition and into the lower compartment, the portion of the conveyor tube passing through said upper compartment being impervious and the portion of the conveyor tube extending downwardly into the lower compartment being provided with exit means including exit apertures at least in the area of the conveyor tube adjacent the partition wall, the partition wall being provided with a plurality of openings surrounding the conveyor tube and communicating the lower compartment with the upper compartment, filter means in the form of filter tubes covering each opening in the partition wall and extending downwardly in the lower compartment and parallel to the conveyor tube, at least one gas outlet communicating with the upper compartment, suction means associated with the gas outlet to provide a reduced pressure within the chamber, discharge means at the base of the housing associated with the lower compartment for discharging solid matter separated from the gas stream, whereby solid laden gas is conveyed into said lower compartment downwardly by the conveying tube and the gas of the stream is drawn from the conveyor tube immediately past the partition, through the surrounding filter tubes in order to prevent the formation of counter gas flows to the gravity discharge of the solids being separated from the gas stream.

2. An apparatus as defined in claim 1, including means for cleaning solid matter from said filter tubes.

3. An apparatus as defined in claim 2, wherein said filter cleaning means comprises fluid conduit means arranged in the upper compartment in the vicinity of respective openings in the partition wall and the fluid conduit means having outlet means adapted to direct compressed fluid through said opening and into said filter tube, whereby to dislodge solid matter adhering to said filter tube.

4. An apparatus as defined in claim 3, wherein the filter cleaning means includes valve means for intermittently controlling the compressed fluid emitted from said outlet means.

5. An apparatus as defined in claim 3, wherein said fluid conduit means comprises a header pipe and depending branch pipes, and said outlet means are provided on said branch pipes in the form of jet nozzles directed to the respective openings in the partition wall.

6. An apparatus as defined in claim 1, wherein said chamber comprises an elongated tube-like member rectangular in cross-section and said base comprises a funnel-like configuration.

7. An apparatus as defined in claim 6, including valve means at the bottom of said base having funnel-like configuration, providing access to remove therefrom solid matter deposited in said funnel-like configuration.

8. An apparatus as defined in claim 6, wherein said exit means includes a discharge opening adjacent the bottom end of the gas inlet conveyor tube to provide for gravity discharge of the solid matter, and said opening and bottom end of the conveyor tube are located close to the bottom ends of the filter tubes.

9. An apparatus as defined in claim 8, wherein said discharge opening and bottom end of the conveyor tube are located within said funnel-like configuration.

10. An apparatus as defined in claim 1, wherein said filter tubes each are supported from said partition wall and are further supported respectively by cylindrical shaped frame means extending within said filter tubes, said frame means being supported via lugs of a horn-shaped member having an annular flange supported upon said partition wall.

11. An apparatus as defined in claim 1, wherein said exit means includes a discharge opening adjacent the bottom end of the gas inlet conveyor tube to provide for gravity discharge of the solid matter, and said opening and bottom end of the conveyor tube are located between the partition wall and the bottom ends of the filter tubes but closer to the partition wall.

12. An apparatus as defined in claim 1, wherein said openings in the said partition wall are positioned in spaced relation one to the other and are provided generally throughout the area of the partition wall and surround said centrally located conveyor tube, the filter tubes covering respective openings being elongated and extending in the lower compartment parallel to the conveyor tube, said conveyor tube having a plurality of exit apertures in the upper area of the conveyor tube within the confines of the lower compartment and adjacent the partition wall and solid matter discharge means provided on the conveyor tube adjacent the bottom end thereof.

13. A gas filter apparatus as defined in claim 1, wherein the gas inlet conveyor tube passes into the upper compartment through the top wall.

14. A gas filter apparatus as defined in claim 1, wherein the gas inlet conveyor tube passes into the upper compartment through the side wall.

15. An apparatus as defined in claim 1, wherein the gas inlet conveyor passes centrally of the partition wall.

16. An apparatus as defined in claim 1, wherein said chamber comprises a tube-like member of circular cylindrical cross-section and said base comprises a funnel configuration.

* * * * *